Feb. 12, 1952     E. E. LAKSO     2,585,559
MULTIPLE LINE ARTICLE ALIGNING DEVICE
Filed June 18, 1947
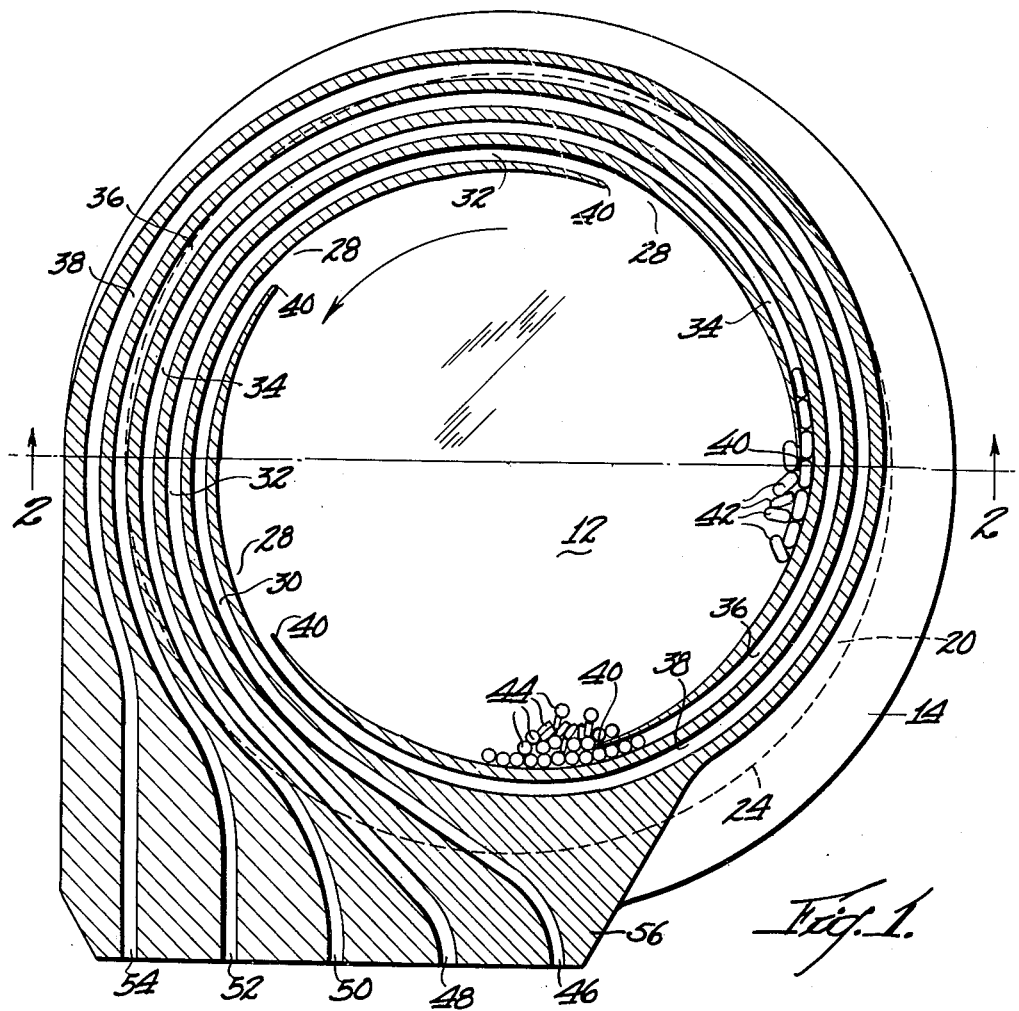
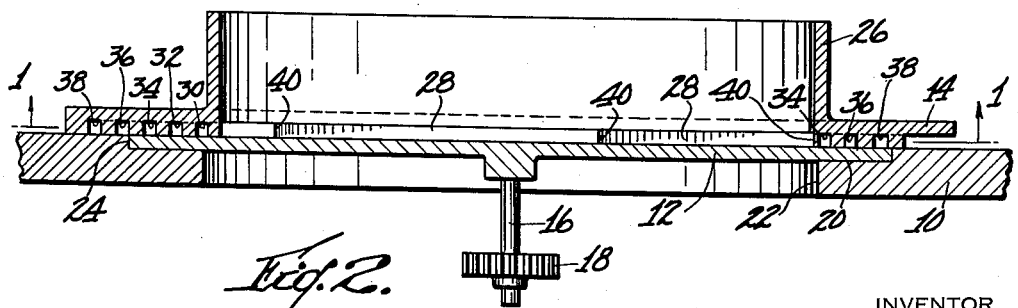
INVENTOR.
Eino E. Lakso
BY Charles R. Fay,
ATTORNEYS.

Patented Feb. 12, 1952

2,585,559

UNITED STATES PATENT OFFICE 2,585,559

MULTIPLE LINE ARTICLE ALIGNING DEVICE

Eino E. Lakso, Fitchburg, Mass.

Application June 18, 1947, Serial No. 755,278

10 Claims. (Cl. 198—30)

1

This invention relates to a device for alining helter skelter articles into a plurality of lines of alined articles for greatly increased speed of delivery of alined articles to a single delivery station. The invention is particularly adapted to the processing of pills, tablets, capsules, globules, etc., but may be used with or without modification for other articles without departing from the scope of the invention.

The principal object of the invention is the provision of a practical and relatively uncomplicated device or mechanism for multiplying the speed of delivery of alined articles at a delivery station for counting, packaging, etc., it being obvious that the faster the articles are delivered, the greater production of packaged and counted articles is possible, and it is well known in the art that the slowest step in the process of production of counted and packaged articles is in the filling of the articles into the packages, the washing, labeling, closing, etc., being relatively easy of accomplishment at high speeds. This is especially true of the larger sizes of tablet and capsule bottles.

To this end, the present invention has for a more specific object the provision of an article supporting rotary disc overlain by a continuous slotted wall, each slot initiating a passageway of a size just sufficient to receive a line of articles, and the passageways all leading to a delivery station; the provision of a device as aforesaid wherein the passageways spiral about the wall to varying degrees and lengths so that all the passageways terminate at a single delivery point; and the provision of the device above stated wherein the passageways intersect the wall to open onto the disc in a substantially tangential manner relative to the disc, the passageway spirals extending in the same general direction as the disc rotation, so that the disc by its rotary movement continuously urges the articles into the passageways all around the effective surface of the disc.

Other objects and advantages of the invention will appear hereinafter.

Reference is to be had to the accompanying drawings in which

Fig. 1 is a horizontal section through the top passageway plate; and

Fig. 2 is a vertical section on line 2—2 of Fig. 1.

In order to illustrate this invention, it has been simply shown as comprising three main parts, a base plate or table 10, a rotary disc 12, and a top plate or passageway plate 14. The disc may be supported in any way desired and is provided with a shaft 16 to rotate the same by means of a motor, gear, chain, etc., a gear 18 being here shown.

The base plate or table is circularly recessed as at 20 about a smaller circular opening 22, and the disc may be peripherally supported in the recess although this is not necessary. It is to be noted, however, that the top surface of the disc and the top surface of the base plate and table are coplanar for a reason to be described, and the periphery of the disc reasonably closely fits the edge 24 of the recess 20.

The top plate 14 rests on the table top and on the disc but not so heavily but what the disc rotates easily under the top plate which may be secured in fixed relation as to the base plate by any convenient means. In any case, the top plate is generally annular and overlaps the periphery of the disc at both sides as clearly shown in Fig. 2. At its inner edge the top plate extends upwardly in annular form as at 26 to provide a hopper or the like to contain the articles to be alined, and this forms a circular wall against the entire length of which the articles are propelled as the disc rotates in the direction of the arrow in Fig. 1.

The wall 26 is provided with a plurality of slots 28 substantially equal circumferentially positioned, and each slot is considerably elongated but is nowhere much wider than the width of the articles to be alined. These slots each initiates a generally spiral passageway, 30, 32, 34, 36 and 38. Each passageway is generally tangential to the disc or the annular wall 26 and gradually merges into the interior vertical surface of the latter in a smooth curve, almost on the arc of a circle, and as the articles are rotated, they are impelled outwardly and catch on the leading edges 40 of the slots 28. The passageways are so proportioned as to allow the articles to enter only in the alinement desired, so that capsules 42 must progress as in passageway 34 only in end to end relation, and tablets 44 can enter as in passageway 36 only on their sides, never on edge. This showing is only to illustrate the invention since but one type of article is processed at one time.

The passageways are all of different lengths, passageway 30 being the shortest and ending at 46; passageway 32 being the next longest and ending at 48; and passageways 34, 36 and 38 being of increasing length and degree of extent about wall 26 and terminating at 50, 52 and 54 respectively. By this construction, the passageways all terminate on a common line, as preferably, at a single delivery or discharge station. Of course, each passageway at its delivery end may connect with a down chute, and the passageways could terminate closer together. The spacing here shown is to accommodate a series of packages.

Not only does the disc 12 impel the articles against wall 26, it also helps carry the articles around the wall, depending on passageway length. However, if the passageway is a long one, as those at 36 and 38, it is preferable to provide a "dead" support, such as the base plate 10, for a part of the length of the passageway, to avoid crushing and denting. Since each tablet, capsule, or globule on the disc is urged forwardly, this imparts too great a force on the articles in the longer passageways.

The portion 56 of the top plate shown extended in Fig. 1 allows material for the terminal points of the passageways, and it is to be understood that the passageways are completely enclosed for their entire lengths.

This invention is seen to provide a relatively simple construction for multiplying the speed of delivery of oriented or alined articles, the present illustration showing a five-fold increase, which, however, may be varied by increasing or decreasing as circumstances require.

Having thus described my invention and the advantages thereof, I do not wish to be limited to the details herein disclosed otherwise than as set forth in the claims, but what I claim is:

1. Article alining device comprising a rotatable article support, a curved wall against which the articles are moved by said means, said wall having a series of widely spaced openings therein through which the articles are moved in lines, and a passageway for each opening, said passageways leading to a single delivery station for all the lines of articles, and overlying for the most part the rotatable article support for travel of the articles through the passageways under influence of the said support.

2. Article alining device comprising a rotatable article support, a wall generally co-axially arranged relative thereto and thereabove, said wall having a series of circumferentially spaced openings therein receiving the articles, a passageway for each opening, said passageways leading to a single delivery station for the articles, the article support forming a traveling bottom for each passageway.

3. Article alining device comprising a rotary article supporting disc, a wall against which the articles are moved by the action of the disc, an elongated slot in the wall, and a curved passageway leading from the slot in general spiral relation to the wall to lead the articles in line to a delivery station, the latter being at a circumferentially spaced location relative to the wall, from the slot.

4. Article alining device comprising a rotary disc, a wall about the disc forming a continuous abutment, a series of spaced passages starting at the abutment in substantially tangential relation thereto and curving around the abutment to varying degrees to terminate at a line, the delivery station being at the line.

5. Article alining means comprising an article supporting rotary disc, a continuous wall above the disc, said wall having a series of circumferentially spaced elongated slots therein initiating a like number of elongated narrow passageways each of which is located in general tangential relation to the wall and curves around the wall at least partly, to terminate at a single delivery station.

6. Multiple line alining device comprising a rotary disc on which the articles are deposited in helter skelter relation, a substantially continuous abutment arranged to lie in the path of the articles as the latter are moved by the action of the disc, a series of spaced passageways emanating from the abutment at spaced points thereon and generally spiraling around the abutment to different degrees to terminate at a single article delivery station.

7. The device of claim 6 wherein the disc underlies the passageways.

8. The device of claim 7 wherein the disc terminates radially short of the delivery end of the passageways.

9. The device of claim 6 wherein the passageways are successively longer and extend to a greater degree about the abutment.

10. The device of claim 6 wherein the passageways are successively longer and extend further about the abutment, the disc underlying parts of all the passageways and underlying all of the spiral parts of the shorter passageways, but having a diameter to terminate short of the delivery ends of the longer passageways, and fixed means supporting the articles in said passage ends.

EINO E. LAKSO.

REFERENCES CITED

The following references are of record in the file of this patent:

UNITED STATES PATENTS

| Number | Name | Date |
|---|---|---|
| 135,329 | Glidden | Jan. 28, 1873 |
| 1,358,044 | Williams | Nov. 9, 1920 |
| 1,473,604 | Bates | Nov. 13, 1923 |
| 1,862,351 | Hagiwara | June 7, 1932 |
| 1,890,300 | Nagele | Dec. 6, 1932 |